(12) United States Patent
Wisherd et al.

(10) Patent No.: US 9,983,303 B2
(45) Date of Patent: May 29, 2018

(54) PASSIVE RADIO FREQUENCY IDENTIFICATION RANGING

(71) Applicant: ZIH Corp., Lincolnshire, IL (US)

(72) Inventors: David S. Wisherd, Carmel, CA (US); Robert W. Boyd, Eidson, TN (US)

(73) Assignee: ZIH Corp., Lincolnshire, IL (US)

( * ) Notice: Subject to any disclaimer, the term of this patent is extended or adjusted under 35 U.S.C. 154(b) by 240 days.

(21) Appl. No.: 14/329,459

(22) Filed: Jul. 11, 2014

(65) Prior Publication Data

US 2015/0097716 A1    Apr. 9, 2015

Related U.S. Application Data

(60) Provisional application No. 61/888,629, filed on Oct. 9, 2013.

(51) Int. Cl.
| | | |
|---|---|---|
| *G01S 13/06* | (2006.01) | |
| *G01S 13/87* | (2006.01) | |
| *G01S 13/75* | (2006.01) | |

(52) U.S. Cl.
CPC ............ *G01S 13/878* (2013.01); *G01S 13/75* (2013.01)

(58) Field of Classification Search
CPC .............................. G01S 13/75; G01S 13/878
USPC ......................................................... 342/146
See application file for complete search history.

(56) References Cited

U.S. PATENT DOCUMENTS

| | | | |
|---|---|---|---|
| 7,046,657 B2 | 5/2006 | Harrington et al. | |
| 2006/0144123 A1* | 7/2006 | Sunshine | G01N 29/022 73/23.2 |
| 2008/0186136 A1* | 8/2008 | Raphaeli | G01S 5/0215 340/10.1 |
| 2008/0252422 A1* | 10/2008 | Dowla | G06K 7/0008 340/10.1 |
| 2009/0152954 A1* | 6/2009 | Le | H02J 17/00 307/110 |
| 2010/0253481 A1* | 10/2010 | Zand | G01S 5/14 340/10.3 |
| 2010/0328043 A1* | 12/2010 | Jantunen | G06K 7/0008 340/10.3 |
| 2011/0032101 A1* | 2/2011 | Hecht | G07F 17/32 340/572.7 |
| 2011/0181392 A1* | 7/2011 | Cha | G06K 7/0008 340/8.1 |
| 2011/0285511 A1* | 11/2011 | Maguire | G06K 19/0724 340/10.1 |
| 2012/0082190 A1* | 4/2012 | Zhu | H04B 7/063 375/219 |

* cited by examiner

*Primary Examiner* — Timothy A Brainard

(57) ABSTRACT

Systems, methods, apparatuses, and computer readable media are disclosed for providing timing-based distance measurement to a passive radio frequency identification ("RFID") tag using one or more wideband RF signals synchronized with the standard narrowband RF signal. In some embodiments, the narrowband RF signal activates a passive RFID tag creating a backscatter reflection target which returns a modulated narrowband signal and a wideband signal from the passive RFID tag. The one or more wideband receivers determine time-of-flight and/or time-of-arrival measurements for the returned wideband signal. A location measurement is then calculated for the passive RFID tag using the tag data, the known location of the wideband transceivers, and the time-of-flight/time-of-arrival data.

18 Claims, 4 Drawing Sheets

PASSIVE RADIO FREQUENCY IDENTIFICATION RANGING

CROSS-REFERENCE TO RELATED APPLICATIONS

The present application claims the benefit of U.S. Provisional Application No. 61/888,629, entitled "Passive Radio Frequency Identification Ranging", filed on Oct. 9, 2013, the contents of which are incorporated by reference herein in their entirety.

FIELD

Embodiments discussed herein are related to radio frequency identification ("RFID") and, more particularly, to systems, methods, apparatuses, computer readable media and other means for locating a passive RFID tag.

BACKGROUND

RFID transponders, or tags, either active, passive, or semi-active, are sometimes used with a RFID reader for communicating information. RFID tags may also be used to provide information about the locations of entities associated with an RFID tag. Active RFID tags can have an independent source of power, such as a battery, while passive RFID tags are typically powered by the electromagnetic fields that are used to read them. Semi-active RFID tags may contain an independent source of power (e.g., a battery) to power the tag's circuitry and may communicate by drawing power from the electromagnetic fields generated by a reader, similar to a passive RFID tag (e.g., backscatter), with the power source providing extra power for the backscatter signal, such as to provide additional range.

A RFID reader is usually configured to transmit a radio frequency ("RF") electromagnetic field, which can include a data signal. In the case of a passive tag, the RF electromagnetic field, sometimes called an interrogation signal, energizes the tag, thereby enabling the tag to respond by modulating the interrogation signal using a technique called backscattering.

A number of deficiencies and problems associated with manufacturing, using, operating, and communicating with conventional RFID tags are identified herein. Through applied effort, ingenuity, and innovation, exemplary solutions to many of these identified problems are embodied by the present invention, which is described in detail below.

BRIEF SUMMARY

Systems, methods, apparatuses, and computer readable media are disclosed for providing timing-based distance measurement to a passive RFID tag by using one or more wideband RF signals with a conventional narrowband RF signal (e.g., an interrogation signal) of an RFID system.

The term "narrowband" as used in the foregoing application and appended claims refers to a signal band which is not significantly wider than the data rate and is used to refer to the type of signals and frequency ranges that would normally be expected in a conventional RFID reader system. In some example embodiments, narrowband may refer to an electromagnetic signal generated by a transmitter around the 860-960 MHz frequency range, such as signals compatible with conventional EPCglobal Gen 2 standards and protocols or ISO/IEC 18000-6 standards and protocols which provide for communication and data exchange. The term "wideband" as used in the foregoing application and appended claims refers to a generating a signal in a higher band width than may be used in the conventional lower band width interrogation ranges of a conventional RFID reader system. In example embodiments, the wideband signal may be generated in an unlicensed frequency band, such as an electromagnetic signal generated by a transmitter around the 2.4 GHz range or the 6-7 GHz ultra-wideband range, for example. Such higher bandwidths allow for a higher level of accuracy in measurements. The term "tag" as used in the foregoing application and appended claims refers to a physical medium used in a RFID system that includes at least one antenna and circuitry.

While there are many types of data signals that could be used in embodiments of this invention, it may be desirable to use data signals that are already supported in existing systems in order to leverage existing infrastructure, reduce costs of developing new devices, and to allow tags and/or readers to be used in systems different than the newly invented systems disclosed here. There are at least two standards which describe data and operating methods which may be used in communication between a narrowband reader and a passive or semi-active RFID tag. These include: Standard 18000-6 by ISO/IEC (Information Technology Radio Frequency Identification for Item Management Part 6: Parameters for air interface communications at 860 MHz to 960 MHz) and Standard Class-1 Generation-2 by EPCglobal/GS-1 (EPC Radio Frequency Identity Protocols Class-1 Generation-2 UHF RFID Protocol for Communications at 860 MHz-960 MHz). Searching for a short sequence representing specific data or a change in communication state by the tag would be one way for the wideband transceiver to recognize that a received signal has been backscatter reflected from a tag. There are also standards which describe air interface protocols and application program interfaces (API) for real-time locating systems (RTLS). This includes Standard 24730 by ISO/IEC—Information technology—Real-time locating systems (RTLS). Although the 24730 standard assumes an active tag transmitter is being used to create the locating signal, other aspects of this standard including some specific protocols and APIs of 24730 could also be used with the signal reflected from the tag using the embodiments described herein.

An RFID tag may also be referred to as a transponder. An RFID tag may be either active or passive, where an active RFID tag can have an independent source of power, such as a battery, while a passive RFID tag is typically powered by wireless radiation, such as an RF signal, emitted from a source device. While the embodiments described herein generally refer to passive RFID tags or passive tags, the embodiments and operations could additionally or alternatively be performed using semi-active RFID tags. As such, when "passive RFID tag" or "passive tag" is used herein, it is understood that the disclosed features and operations may also refer to a "semi-active RFID tag".

A transmitter, such as a RFID reader, may transmit an RF signal that may energize a passive tag within its RF field, thereby activating the passive tag and enabling the tag to modulate the RF signal by switching its RF antennas to create a backscatter reflection target. This modulated signal returned from the passive RFID tag can provide data from the RFID tag to an RFID reader. The term "transceiver" as used in the foregoing application and appended claims refers to an apparatus that may transmit and/or receive radio frequency ("RF") signals at various frequencies. A transceiver may be one of an RFID reader, interrogator, locator, illuminator, transponder or any other apparatus that may transmit and/or receive RF signals.

In some embodiments, the narrowband RF signal is an interrogation signal that initiates backscatter modulation of the narrowband signal by a responding passive RFID tag. A RFID reader may transmit one or more narrowband RF signals that activate passive RFID tags within the field of the reader. The activated passive tag may switch its antennas, creating a backscatter reflection target that may then reflect a modulated narrowband signal.

In some embodiments, a narrowband RFID reader may transmit one or more narrowband RF signals to activate and interrogate passive RFID tags within the RF range of the narrowband reader. One or more wideband transceivers may transmit one or more wideband RF signals in coordination with the narrowband RF signal transmission. The narrowband RF signal may activate a passive RFID tag creating a backscatter reflection target. A modulated narrowband signal and wideband signal may be returned from the passive RFID tag as a result of the backscatter reflection. The one or more wideband RFID transceivers may listen for the reflected wideband signal from the tag and determine a time value, which may comprise time-of-flight or time-of-arrival data, for the reflected signal. In embodiments having a plurality of wideband transceivers, the clocks of the plurality of transceivers may be synchronized with a system clock, or clock differentials may be known by a processor, to coordinate the data measurements. The known location of the one or more wideband transceivers and the time value for the reflected signal may be used to calculate a location measurement for the activated passive RFID tag.

Some embodiments may provide a method for passive RFID ranging comprising transmitting a narrowband RF signal and transmitting a wideband RF signal synchronized with the narrowband RF signal. The method may further comprise receiving a reflected wideband RF signal from a passive RFID tag and determining a time value for the reflected wideband RF signal. The method may further comprise calculating a location measurement for the passive RFID tag based on the time value and the location of the wideband RF transceiver.

Some further embodiments may provide a non-transitory computer readable medium comprising computer program code including instructions for transmitting a narrowband RF signal and transmitting a wideband RF signal synchronized with the narrowband RF signal. The instructions may further comprise receiving a return wideband RF signal from a passive RFID tag and determining a time value for the return wideband RF signal. The instructions may further comprise calculating a location measurement for the passive RFID tag based on the time value and the location of the wideband RF transceiver.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
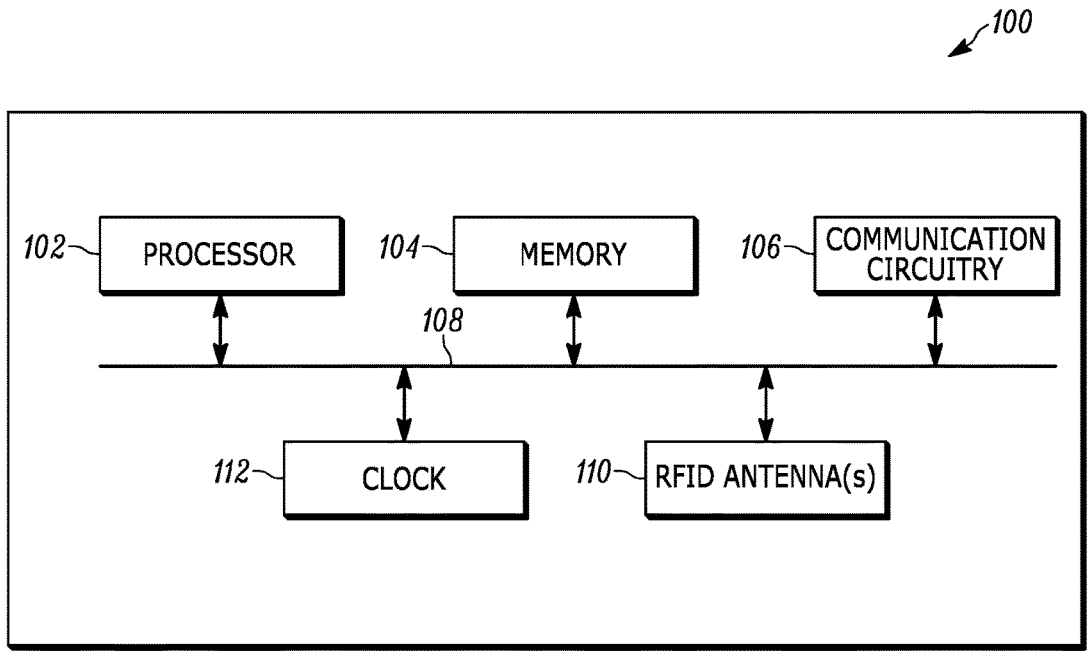
FIG. 1 shows a block diagram of components that may be included in devices for performing passive RFID ranging in accordance with some embodiments.

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Existing radio frequency ("RF") signal amplitude-based radio frequency identification ("RFID") reader systems have drawbacks in providing accurate ranging for passive RFID tags. The narrowband signals, such as those used by a standard EPCglobal Gen 2 reader, are unable to provide accurate ranging measurements within typical 100-foot RFID read environments. Using these systems to perform ranging based on signal strength requires a plurality of ranging readers that are highly susceptible to multipath nulls and errors. Such existing systems have difficulty in accurately locating a tag, such as discriminating between adjacent portals to determine which portal a tag passed through, due to issues with tag capture rate in the desired portal and erroneous readings from adjacent portals.

In such passive RFID tag systems, the narrowband RFID reader transmits an RF signal which energizes the passive RFID tag, thereby enabling the tag to modulate the RF signal by switching its RF antenna to create a backscatter reflection target. This modulated signal returned from the passive RFID tag can provide data from the RFID tag to an RFID reader. In some embodiments, the narrowband RFID reader may both transmit an interrogation signal to the passive RFID tags and listen for return signals from the passive RFID tags. In some embodiments, these operations may be provided by separate devices, such as where a narrowband RFID interrogator may transmit the interrogation signal and a narrowband RFID reader may listen for the return signals.

Embodiments of the present invention are directed to methods, systems, apparatuses, and computer readable media for determining the location of a passive RFID tag with more accuracy while adding virtually no extra requirements on an existing, or previously installed, passive RFID system of tags and readers. In some embodiments of the present invention, a passive ranging system includes the addition of one or more wideband RFID transceivers that act in conjunction with an existing narrowband RFID system to provide accurate ranging for passive RFID tags. In some example embodiments, the existing narrowband RFID reader may activate (e.g., excite) a tag and the tag may then respond during a time when the wideband RFID transceivers are listening. In other example embodiments, the one or more wideband RFID transceivers may operate asynchronously and in parallel to the existing narrowband RFID system. In some embodiments, the passive RFID tags may comprise two antennas where one antenna may be optimized for narrowband signals and one antenna may be optimized for wideband signals.

Embodiments of the present invention are directed to methods, systems, and apparatuses whereby a second coordinated wideband RF signal is transmitted in conjunction with the standard narrowband RF signal. The narrowband RFID system reads the data provided by the modulated narrowband reflected signal from the passive RFID tag in the standard fashion, while the wideband RFID transceiver may determine more accurate ranging for the passive RFID tag, such as a location within a facility or which portal the tag is passing through, using the wideband reflected signal.

Embodiments of the present invention provide passive ranging systems where wideband RFID transceivers listen for a wideband RF signal reflected via backscatter reflection from a passive RFID tag. When a wideband RFID transceiver receives an appropriate reflected wideband RF signal, it records the time-of flight or time-of-arrival for the signal. The wideband transceiver may recognize a received signal as being reflected from a RFID tag by determining that the received signal has been perturbed in an expected fashion as a result of the backscatter reflection from the tag. In some embodiments, the narrowband reader may transmit a signal to excite (activate) a tag and instruct the wideband transceiver to listen at a particular time for the return signal. In some embodiments, the narrowband reader may transmit a signal to excite one or more tags and control the timing of when each of the one or more tags responds such that only one of the one or more tags is responding at a time. The wideband transceiver may transmit the wideband RF signals which will only be returned by one of the one or more active tags while that one tag is communicating in response to the narrowband signal, and the wideband transceiver may continuously listen for such return signals from each one of the one or more tags, identifying the return signal as from a particular tag based on the tag's response timing provided by the narrowband reader. In some embodiments, the wideband transceivers may be configured to listen for a pre-defined particular short sequence from a tag. In some embodiments, the wideband transceiver may demodulate the signal received from the tag to retrieve a tag identifier. The passive ranging system may then determine the location of the passive RFID tag using the known location of the wideband RFID transceivers and the time-of-flight or time-of-arrival data for the reflected wideband signal.

In some embodiments, the narrowband RFID system may operate using EPCglobal Gen 2 or ISO-18006 protocols and standards and the wideband RFID transceivers may operate using ISO-24730 protocols and standards. In some embodiments, the wideband transceivers may provide locating using ISO-24730 and demodulate return signals using EPCglobal Gen 2 or ISO-18006 to retrieve data from the tags.

In another embodiment, each wideband RFID transceiver in a series of transceivers transmits, in sequence, a ranging signal to a passive RFID tag that has been activated by the narrowband RFID system. All the wideband RFID transceivers within the RF range measure the time-of-arrival of the signal reflected from the passive RFID tag. This data from all the transceivers can then be combined to provide enhanced accuracy and coverage for the ranging measurement. In some embodiments, common observations of the system may be made so that clock differentials for the transceivers may be known and tracked, such as by a processor, and used to synchronize the signals and the captured time-of-flight and/or time-of-arrival.

Embodiments of a passive ranging system may use continuous wideband signals for closer ranges thus allowing ranging to the limits of transmitted signal suppression in the wideband transceiver; or may use RF signal bursts with interstitial listening periods, for longer ranges. For example, at longer ranges, quiet listening periods may be needed for the transceivers to listen for returned signals.

In some embodiments, distance measurement to a tag may be provided by direct ranging using the time-of-flight from a primary (transmitting) wideband RFID transceiver to a passive RFID tag. In further embodiments, ranging may use reflected signal time-of-arrival from the target tag at secondary (non-transmitting) wideband RFID transceivers for enhanced accuracy. Embodiments of the present invention may provide for ranging systems using portal, radial, linear, and/or multi-dimensional tag location data. Some embodiments of the present invention may use different types of wideband signals, including, but not limited to, direct sequence spread spectrum, frequency chirp modulation, and other types of spread spectrum signals.

In some embodiments, the passive RFID tag may comprise a dual band antenna inlay that is compatible with a standard narrowband signal, such as an EPCglobal Gen 2 signal, and has an enhanced response at the wideband ranging frequency.

FIG. 1 shows a block diagram of components that may be included in an RFID transceiver, such as narrowband reader 402, wideband transceiver 404, or other device that may provide passive RFID ranging in accordance with embodiments discussed herein. RFID transceiver 100 may comprise one or more processors, such as processor 102, one or more memories, such as memory 104, one or more RFID antennas, such as RFID antennas 110, communication circuitry 106, and clock 112. Processor 102 can be, for example, a microprocessor that is configured to execute software instructions and/or other types of code portions for carrying out defined steps, some of which are discussed herein. Processor 102 may communicate internally using, e.g., data bus 108, which can be 16, 32, 64 or more bits wide (e.g., in parallel). Data bus 108 can be used to convey data, including program instructions, between processor 102 and memory 104.

Memory 104 may include one or more non-transitory storage media such as, for example, volatile and/or non-volatile memory that may be either fixed or removable. Memory 104 may be configured to store information, data, applications, instructions or the like for enabling RFID transceiver 100 to carry out various functions in accordance with example embodiments of the present invention. For example, the memory could be configured to buffer input data for processing by processor 102. Additionally or alternatively, the memory could be configured to store instructions for execution by processor 102. Memory 104 can be considered primary memory and be included in, for example, RAM or other forms of volatile storage which retain its contents only during operation, and/or memory 104 may be included in non-volatile storage, such as ROM, EPROM, EEPROM, FLASH, or other types of storage that retain the memory contents independent of the power state of RFID transceiver 100. Memory 104 could also be included in a secondary storage device, such as external disk storage, that stores large amounts of data. In some embodiments, the disk storage may communicate with processor 102 using an input/output component via bus 108 or other routing component. The secondary memory may include a hard disk, compact disk, DVD, memory card, or any other type of mass storage type known to those skilled in the art.

Processor 102 can also communicate with RFID tags using one or more RFID antennas 110. For example, RFID antennas 110 can facilitate communication with transponders, either active or passive. RFID antennas 110 can enable communication at various frequencies, including those that may be later developed, using any suitable technique (e.g., the frequency hopping spread spectrum technique, the listen before talk technique, etc.). In some embodiments, to initiate communications RFID transceiver 100 may expose the transponders of the tag to a RF electromagnetic field or signal, also referred to as an interrogation signal. In the case of a passive tag, the interrogation signal transmitted by RFID antennas 110 may energize the transponders within the interrogation range and thereby prompt the tag to respond to RFID transceiver 100 by modulating the field in a well-known technique called backscattering.

Clock 112 may be used to provide coordination, through a control process, of the transmission of the wideband signal with the transmission of the narrowband signal. Clock 112 may also provide a timing signal for use in determining signal timing data, such as time-of-flight and/or time-of arrival. Clock 112 may further be used to determine clock differentials among the transceivers, such as by observing common events at each of the transceivers.

In some embodiments, processor 102 can also be configured to communicate with external communication networks and devices using communications circuitry 106, and may use a variety of interfaces such as data communication oriented protocols, including X.25, ISDN, DSL, among others. Communications circuitry 106 may also incorporate a modem for interfacing and communicating with a standard telephone line, an Ethernet interface, cable system, and/or any other type of communications system. Additionally, processor 102 may communicate via a wireless interface that is operatively connected to communications circuitry 106 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1× EV-DO, GPRS, W-CDMA, LTE, and/or any other protocol.

Figure 2:
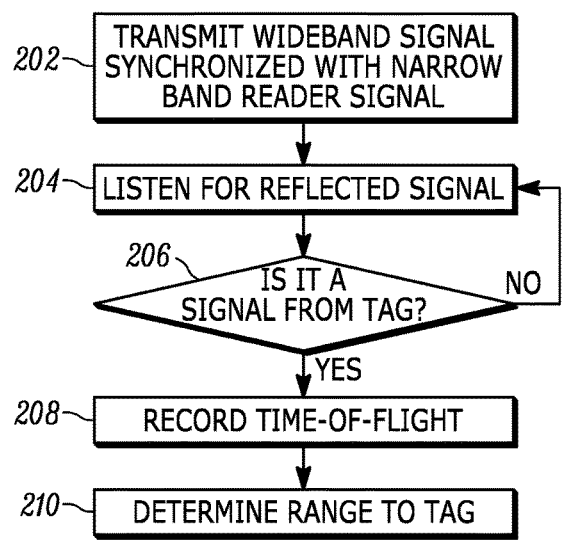
FIG. 2 is a flowchart illustrating an example process for passive RFID ranging in accordance with some embodiments.

FIG. 2 illustrates a flowchart of an exemplary process for passive RFID ranging in accordance with some embodiments of the present invention. The process may start at 202, where wideband transceiver 404 may transmit a wideband RF signal which is synchronized with the transmission of a narrowband RF signal from narrowband reader 402.

At 204, wideband transceiver 404 may wait and listen for a return wideband RF signal. When wideband transceiver 404 receives a return wideband RF signal it determines at 206 if the return signal was reflected back from a passive RFID tag, such as tag 406. The wideband transceiver may recognize a received signal as being reflected from a RFID tag by determining that the received signal has been perturbed in an expected fashion as a result of the backscatter reflection from the tag. In some embodiments, the reader may instruct a specific tag to respond during a time period when the wideband transceiver is listening. In some embodiments, the wideband transceiver may demodulate the signal to retrieve the tag's data.

If the received signal was reflected back from a passive RFID tag, at 208, the wideband transceiver determines the time-of-flight for the signal, such as by using clock signal generated by clock 112.

At 210, the passive ranging system uses tag data captured by a narrowband reader, the known location of the wideband transceiver and the time-of-flight data to determine a location measurement for the passive RFID tag.

If at 206 the wideband transceiver determines that the received signal was not reflected back from a passive RFID tag, it returns to 204 and continues listening for a reflected signal.

Figure 3:
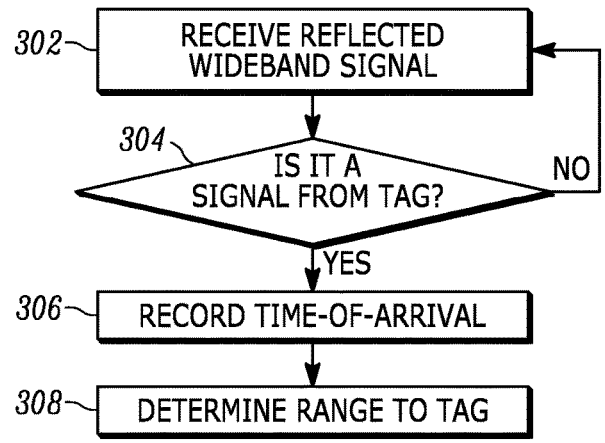
FIG. 3 is a flowchart illustrating another example process that may be used in passive RFID ranging in accordance with some embodiments.

FIG. 3 illustrates a flowchart of another exemplary process used in passive RFID ranging in accordance with some embodiments of the present invention. The process may start at 302, where one or more non-transmitting wideband transceivers may listen for a reflected wideband RF signal. When a wideband transceiver receives a return wideband RF signal it determines at 304 if the return signal was reflected back from a passive RFID tag, such as tag 406.

If the received signal was reflected back from a passive RFID tag, at 306 the wideband transceiver determines the time-of-arrival for the signal.

At 308, the passive ranging system uses tag data captured by a narrowband reader, the known location of the wideband transceivers and the time-of-flight and time-of arrival data to determine a location measurement for the passive RFID tag.

If at 304 the wideband transceiver determines that the received signal was not reflected back from a passive RFID tag, it returns to 302 and continues listening for a return signal.

Figure 4:
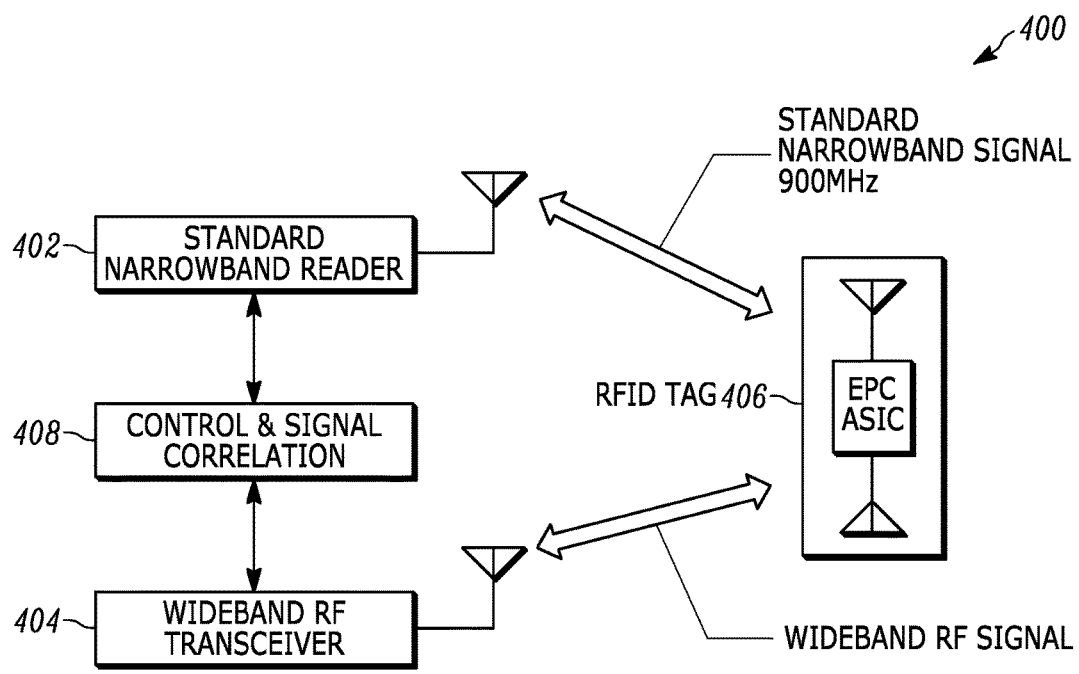
FIG. 4 shows an exemplary system for passive RFID ranging in accordance with some embodiments.

FIG. 4 illustrates an exemplary system for passive RFID ranging in accordance with some embodiments. System 400 may include one or more narrowband RFID readers, such as narrowband reader 402, one or more wideband RFID transceivers, such as wideband transceiver 404, and one or more passive RFID tags, such as tag 406. In order to identify data associated with passive RFID tag 406, narrowband reader 402 may transmit a narrowband RF signal which energizes passive RFID tag 406, thereby enabling passive RFID tag 406 to modulate the RF signal by switching its RF antenna to create a backscatter reflection target. Narrowband reader 402 may then read a reflected modulated signal from passive RFID tag 406 which indicates data associated with passive RFID tag 106.

Wideband transceiver 404 may transmit a wideband RF signal synchronized with the transmission by narrowband reader 402. The energized passive RFID tag 406 may then reflect back the wideband RF signal that may be received by wideband transceiver 404. Wideband transceiver 404 may determine and store a time-of-flight for the reflected signal which may then be used to determine the location of passive RFID tag 406.

The synchronization of the signal transmissions by narrowband reader 402 and wideband transceiver 404 may be performed using control and signal correlation module 408.

Figure 5:
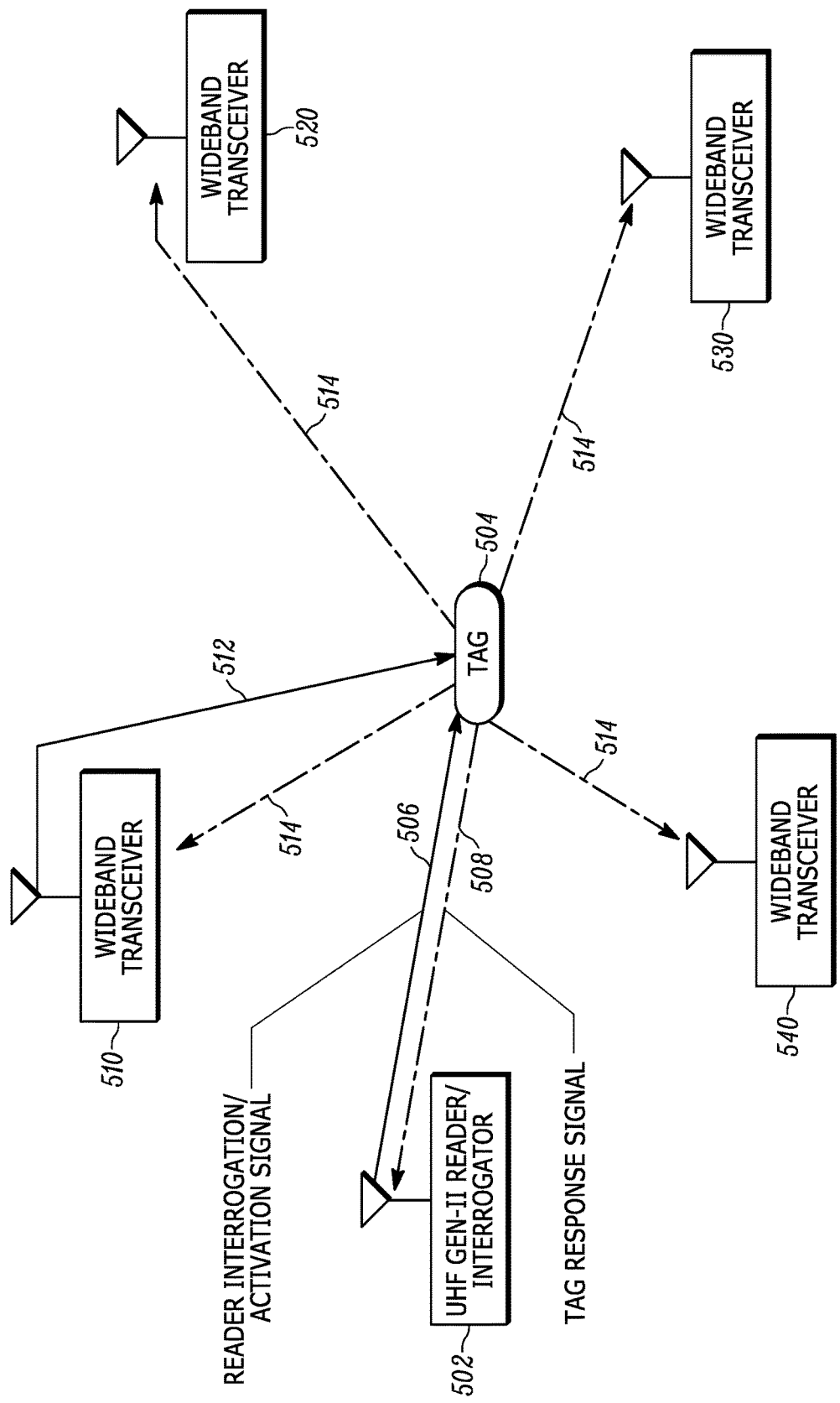
FIG. 5 shows an exemplary environment for using passive RFID ranging for locating RFID tags in accordance with some embodiments

FIG. 5 illustrates one exemplary embodiment for using passive RFID ranging for locating RFID tags in accordance with some embodiments. Passive RFID ranging may be used in a location, such as a warehouse, where users may wish to know the location of an RFID tag (or the item or inventory that the tag is attached to) with a high accuracy. A facility may contain one or more narrowband readers, such as narrowband reader 502, and one or more wideband transceivers, such as wideband transceivers 510, 520, 530, and 540. One or more passive RFID tags, such as passive RFID tag 504, may be located within the facility and may be attached to items of inventory stored within the facility, for example.

As shown in FIG. 5, narrowband reader 502 may transmit an interrogation signal 506 to tag 504 to active (e.g., energize) tag 504 and instruct tag 504 to reply to the interrogation signal by responding with tag data 508 to narrowband reader 502.

Once narrowband reader 502 has activated tag 504, one or more wideband transceivers, such as wideband transceivers 510, 520, 530, and 540, may transmit one or more wideband signals, such as wideband signal 512, to tag 504 for ranging measurements. While activated and communicating, tag 504 may return wideband signals, such as by backscatter reflection, which may be received by the one or more wideband transceivers. For example, tag 504 may return signal 514 in response to wideband signal 512 which may be received by one or more of wideband transceivers 510, 520, 530, and 540.

The one or more wideband transceivers, 510, 520, 530, and 540, may listen for return signals and upon receiving a return signal, the wideband transceiver may determine a time-of-arrival and/or time-of-flight for the received signal. The one or more wideband transceivers may transmit data regarding the received signal including the time-of-arrival/time-of-flight to a processor for use in calculating the location of tag 504. The processor may use the data from the wideband transceivers, the known locations of the wideband transceivers, and optionally, tag data from the narrowband reader signal, to determine the location of tag 504 within the facility. In some example embodiments, the data may be transmitted to one of the wideband transceivers, acting as the processor, for determining the location of tag 504.

Figure 6:
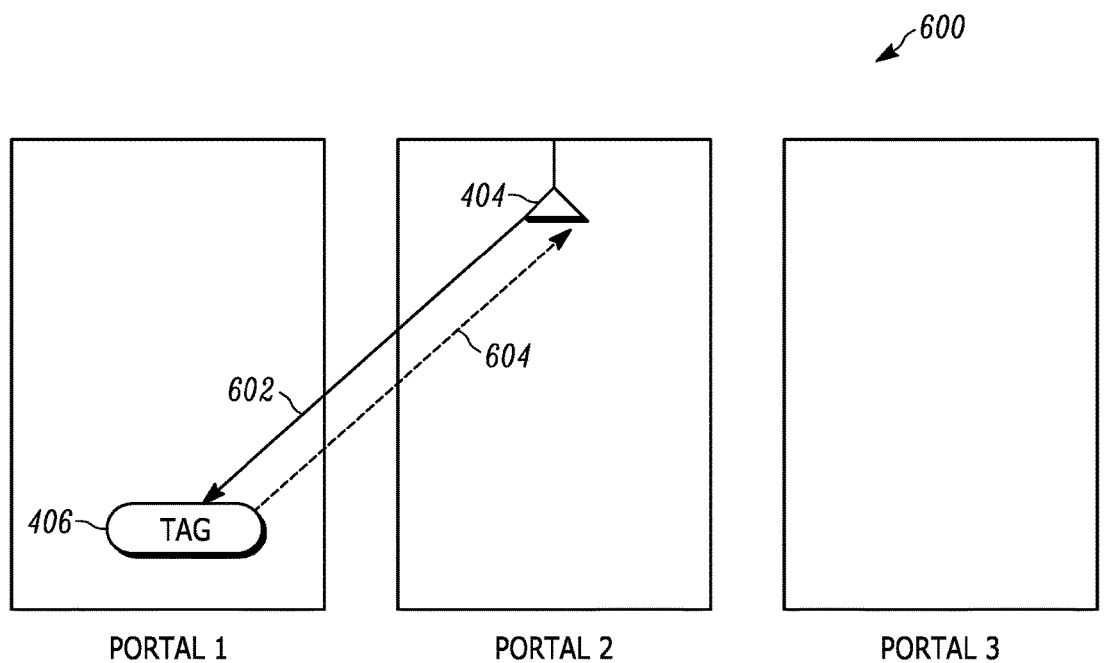
FIG. 6 shows an exemplary environment for using passive RFID ranging for portal discrimination in accordance with some embodiments.

FIG. 6 illustrates one exemplary embodiment for using passive RFID ranging for portal discrimination in accordance with some embodiments. Passive RFID ranging may be used, for example, in a warehouse, such as environment 600, where users may wish to know not only that the entity associated with the passive RFID tag was in the warehouse, but also through which portal the entity entered and exited the warehouse. In FIG. 6, while environment 600 is illustrated with three portals for entering/exiting the environment, although there may be any number of portals within the environment. Additionally, while FIG. 6 illustrates an example embodiment using passive ranging for portal discrimination, but it is not limited to such use. Embodiments of the present invention may also include using passive ranging for location measurements including, but not limited to, radial, linear and multi-dimensional location measurements.

An environment, such as environment 600, may contain one or more narrowband readers 402 (not shown) and one or more wideband transceivers 404. Environment 600 is illustrated as comprising one wideband transceiver, 404 covering an area including three portals. Passive RFID tag 406 is being moved through environment 600, specifically exiting through portal 1. While moving through environment 600, passive RFID tag 406 is energized by a narrowband reader 402 (not shown). At the same time that narrowband reader 402 transmits one or more narrowband RF signals to passive RFID tag 406, wideband transceiver 404 transmits a synchronized wideband RF signal, 602.

Passive RFID tag 406 is energized by the narrowband RF signal and creates a backscatter target, reflecting a modulated narrowband signal and a wideband signal. Wideband transceiver 404 listens for the reflected signal, 604, from passive RFID tag 406 and determines time-of-flight for the path from the transceiver to the tag when the reflected signal is received. Wideband transceiver 404 may use an internal clock signal to determine the time-of-flight. The passive ranging system then uses the known location of wideband transceiver 404 and the time-of-flight determination to calculate a location for passive RFID tag 406 and determine that passive RFID tag 406 passed through portal 4. The time data may be stored in a database or other file, or transmitted to a processor, along with other data associated with the tag from the narrowband RFID reader, for use in determining the location measurement for the passive RFID tag. In some embodiments, one of the transceivers may act as the processor by receiving data from the other transceivers and performing the processing of the data for determining the tag location.

Figure 7:
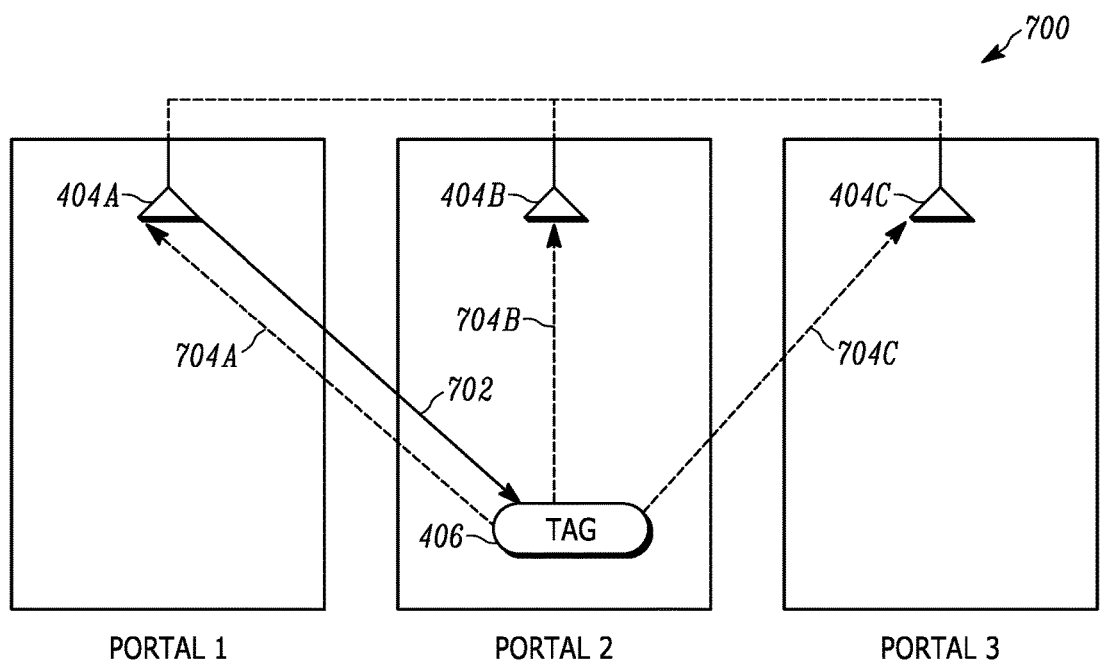
FIG. 7 shows another exemplary environment for using passive RFID ranging for portal discrimination in accordance with some embodiments.

FIG. 7 illustrates another exemplary embodiment for using passive RFID ranging for portal discrimination in accordance with some embodiments. In FIG. 7, while environment 700 is illustrated with three portals for entering/exiting the environment, although there may be any number of portals within the environment. Environment 700 further comprised three wideband transceivers, 404A, 404B, and 404C, located at portals 1, 2, and 3, respectively. Passive RFID tag 406 is being moved through environment 700, specifically exiting through portal 2. While moving through environment 700, passive RFID tag 406 is energized by a narrowband reader 402 (not shown). At the same time that narrowband reader 402 transmits a narrowband RF signal to passive RFID tag 406, wideband transceiver 404A transmits a synchronized wideband RF signal, 702.

Passive RFID tag 406 is energized by the narrowband RF signal and creates a backscatter target, reflecting a modulated narrowband signal and a wideband signal. Wideband transceiver 404A listens for the reflected signal, 704A, from passive RFID tag 406 and determines time-of-flight for the path to the tag when the reflected signal is received.

Wideband receivers 404B and 404C, which are not transmitting, also listen for reflected wideband signals. When wideband receivers 404B and 404C receive reflected wideband signals 704B and 704C, respectively, from passive tag 406, they record time-of arrival data for the reflected signals.

Wideband receivers 404A, 404B, and 404C may use clock differentials in order to correlate the received signal time-of-arrival/time-of-flight data for location measurement.

The passive ranging system then uses the known location of wideband transceivers 404A, 404B, and 404C and the time-of-flight and time-of-arrival data to calculate a location for passive RFID tag 406 and determine that passive RFID tag 406 passed through portal 2. The passive ranging system may use the additional data from wideband transceivers 404B and 404C to improve the accuracy of the location measurement for passive RFID tag 406.

In a further embodiment, wideband transceivers 404A, 404B, and 404C may each transmit a wideband RF signal in sequence, synchronized with the narrowband RF signal, such as by using control and signal correlation module 408, that are each in turn reflected back from passive RFID tag 406. The passive ranging system may use the time-of-flight and time-of-arrival data from each of wideband transceivers 404A, 404B, and 404C, for each of the transmitted signals to further enhance the location measurement of passive RFID tag 406.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system comprising:
   a passive radio frequency identification (RFID) tag;
   a narrowband RFID reader configured to:
   transmit a narrowband radio frequency (RF) signal to enable backscatter reflection of wideband RF signals at the passive RFID tag;
   transmit a timing instruction to synchronize transmission of the wideband RF signals with the enablement of the backscatter reflection via the narrowband RF signal; and
   receive a modulated signal from the passive RFID tag including data associated with the passive RFID tag;
   a wideband RFID transceiver configured to:
   receive the timing instruction from the narrowband RFID reader;
   transmit, based on the timing instruction, the wideband RF signals at a time during which the backscatter reflection at the passive RFID tag is enabled by the narrowband RF signal;
   receive a return wideband RF signal reflected via the backscatter reflection from the passive RFID tag; and
   determine a time value associated with the receiving of the return wideband RF signal; and
   processing circuitry configured to determine a location measurement of the passive RFID tag based at least on the time value determined by the one or more wideband RFID transceivers.

2. The system of claim 1, wherein the narrowband RFID reader is configured to use the EPCglobal Gen 2 standard and the wideband RFID transceiver is configured to use the ISO 24730 standard.

3. The system of claim 2, wherein the system is further configured to provide time synchronization between the EPCglobal Gen 2 narrowband RF signal and the ISO 24730 wideband RF signals.

4. The system of claim 1, wherein the wideband RFID transceiver is configured to transmit the wideband RF signals using one of direct sequence spread spectrum or frequency chirp modulation.

5. The system of claim 1, wherein the wideband RFID transceiver is configured to perform continuous wideband RF signaling.

6. The system of claim 1, wherein the wideband RFID transceiver is configured to perform RF signal bursts with interstitial response periods.

7. The system of claim 1, wherein the location measurement comprises one or more of portal discrimination data, radial location data, linear location data, or multi-dimensional location data.

8. The system of claim 1, wherein the passive RFID tag comprises a transponder having a dual band antenna.

9. The system of claim 1, wherein the passive RFID tag comprises two antennas, wherein a first one of the two antennas is optimized for narrowband RF signals and a second one of the two antennas is optimized for wideband RF signals.

10. The system of claim 1, wherein the time value comprises time-of-flight data between a primary wideband RFID transceiver and the passive RFID tag.

11. The system of claim 1, wherein the time value comprises time-of-arrival data for the return wideband RF signal received at a secondary transceiver.

12. The system of claim 1, wherein wideband RFID transceiver is a first transceiver and is configured to transmit in sequence with a second wideband RFID transceiver based on time synchronization between the first and second wideband RFID transceivers.

13. A method comprising:
   transmitting one or more narrowband RF signals to enable backscatter reflection of wideband RF signals at a passive RFID tag;
   transmitting a timing instruction indicative of a time of the enablement of the backscatter reflection of the wideband signals via the one or more narrowband RF signals;
   transmitting, based on the timing instructions, one or more wideband RF signals at the time during which the backscatter reflection at the passive RFID tag is enabled by the one or more narrowband RF signals;
   receiving a return wideband RF signal reflected via backscatter reflection from the passive RFID tag;
   determining a time value for the return wideband RF signal; and
   calculating a location measurement for the passive RFID tag based on the time value and a location of a wideband RF transceiver.

14. The method of claim 13, wherein the one or more narrowband RF signals are transmitted using EPCglobal Gen 2 standards and the one or more wideband RF signals are transmitted using ISO 24730 standards.

15. The method of claim 13, wherein the one or more wideband RF signals is transmitted using continuous wideband RF signaling.

16. The method of claim 13, wherein the one or more wideband RF signals is transmitted using RF signal bursts with interstitial response periods.

17. The method of claim 13, wherein the location measurement comprises portal discrimination data, radial location data, linear location data, or multi-dimensional location data.

18. A device, comprising:
   one or more processors;
   one or more memory, including instructions therein, which instructions, when executed by the processor, cause the device to:
   receive a timing instruction from a narrowband RFID reader, the timing instruction indicative of a time at which backscatter reflection at a passive RFID tag is enabled by a narrowband signal transmitted by the narrowband RFID reader;

transmit a wideband RF signal according to the timing instruction received from the narrowband RFID reader;
receive a return wideband RF signal reflected via backscatter reflection from the passive RFID tag;
determine a time value for the return wideband RF signal; and
calculate a location measurement for the passive RFID tag based on the time value and the location of the device.

* * * * *